United States Patent [19]
Kaneko et al.

[11] Patent Number: 6,108,468
[45] Date of Patent: Aug. 22, 2000

[54] OPTICAL BRANCHING DEVICE AND METHOD OF OPTICAL TRANSMISSION

[75] Inventors: Tomoyuki Kaneko; Seiji Watanabe, both of Tokyo, Japan

[73] Assignee: NEC Corporation, Tokyo, Japan

[21] Appl. No.: 09/032,110

[22] Filed: Feb. 27, 1998

[30] Foreign Application Priority Data

Feb. 28, 1997 [JP] Japan .................................... 9-046017

[51] Int. Cl.$^7$ .............................. G02B 6/28; H01J 14/02
[52] U.S. Cl. ................................. 385/24; 385/37; 359/130
[58] Field of Search ........................ 385/24, 37; 359/130, 359/125, 127, 129

[56] References Cited

U.S. PATENT DOCUMENTS

| | | | |
|---|---|---|---|
| 5,706,375 | 1/1998 | Mihailov et al. | 385/24 |
| 5,726,785 | 3/1998 | Chawki et al. | 359/130 |
| 5,748,349 | 5/1998 | Mizrahi | 359/130 |

FOREIGN PATENT DOCUMENTS

| | | |
|---|---|---|
| 0730172 | 9/1996 | European Pat. Off. |
| 0794629 | 9/1997 | European Pat. Off. |
| 10-154958 | 6/1998 | Japan . |
| 10-154961 | 6/1998 | Japan . |
| 10-209965 | 8/1998 | Japan . |
| WO 97/06614 | 2/1997 | WIPO . |

OTHER PUBLICATIONS

Abstract of UK Patent Application GB 2 315 380, Noda et al, "Optical add/drop circuit using fiber gratings", Jan. 1998.

M.J. Chawki et al., "Evaluation of an Optical Boosted Add/Drop Multiplexer OBADM including Circulators and Fiber Grating Filters", Proceedings of the European Conference on Optical Communications, vol. 1, Sep. 17, 1995, XP 203255660, pp. 47–50.

T. Yamamoto et al., "High Speed Optical Path Routing by Using Four–Wave Mixing and a Wavelength Router with Fiber Gratings and Optical Circulators", vol. 120, No. 5/6, Nov. 1, 1995, pp. 245–248.

*Primary Examiner*—Hemang Sanghavi
*Attorney, Agent, or Firm*—Sughrue, Mion, Zinn, Macpeak & Seas, PLLC

[57] ABSTRACT

In an optical transmission system, an optical branching device is in use, the number of original transmission lights decreases or level of transmission lights deteriorates for some cause or other. Since output of optical amplifier is predetermined, when the number of transmission lights reduces, level of remaining transmission light is changed, thus departing from optimum operation condition. There is provided an optical branching device including a fiber grating for reflecting light with a wave length different from transmission light, at the time of malfunction such as disconnection, it causes a light with a wave length different from the transmission light to transmit from terminal station or branching station, thus maintaining the level of the transmission light to prescribed level. When the level of the transmission lights deteriorates, it causes the level of transmission light from the branch office to be adjusted. As a result, the level of respective transmission lights is maintained to the original level so that optimum operation condition is maintained, thus the level among the respective transmission lights is capable of being adjusted.

10 Claims, 13 Drawing Sheets

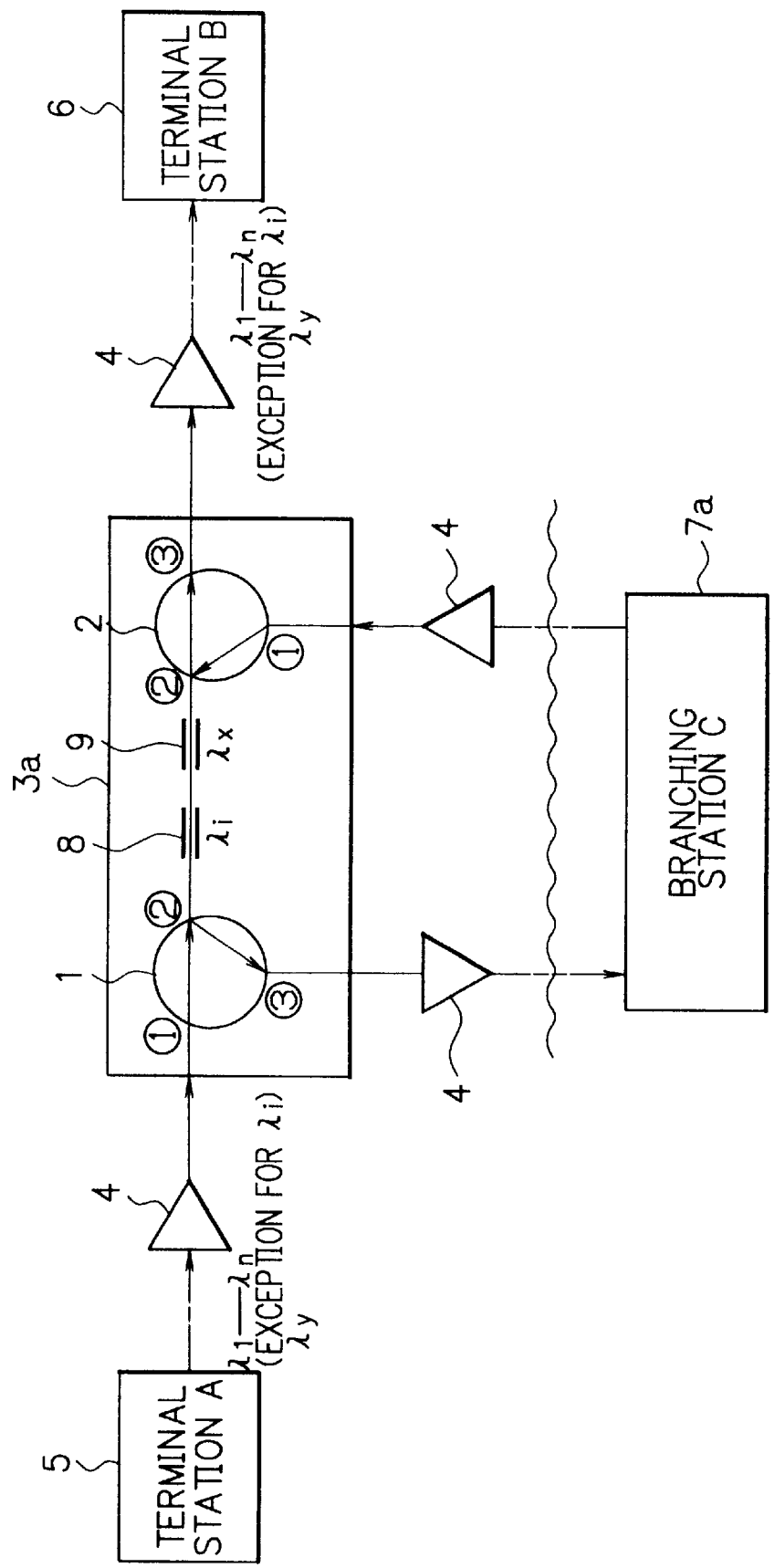

FIG. 4

| | NORMAL STATE | MALFUNCTION STATE | $\lambda_y$ INPUT |
|---|---|---|---|
| OUTPUT OF TERMINAL STATION A | $\lambda_i$ | $\lambda_i$ | $\lambda_i$ $\lambda_y$ |
| INPUT OF BRANCHING DEVICE | $\lambda_i$ | $\lambda_i$ | $\lambda_i$ $\lambda_y$ |
| OUTPUT OF BRANCHING STATION C | $\lambda_i$ $\lambda_z$ | | |
| OUTPUT OF BRANCHING DEVICE | $\lambda_i$ | | $\lambda_y$ |
| OUTPUT OF OPTICAL AMPLIFIER | $\lambda_i$ | (LEVEL CHANGE) | $\lambda_y$ |

FIG. 6

| | NORMAL STATE | MALFUNCTION STATE | $\lambda_x$ INPUT |
|---|---|---|---|
| OUTPUT OF TERMINAL STATION A | $\lambda_i$ ⋀⋀⋀ | $\lambda_i$ ⋀⋀⋀ | $\lambda_i$ ⋀⋀⋀ |
| INPUT OF BRANCHING DEVICE | $\lambda_i$ ⋀⋀⋀ | — | — |
| OUTPUT OF BRANCHING STATION C | $\lambda_z$ ⋀ $\lambda_i$ ⋀ | $\lambda_z$ ⋀ $\lambda_i$ ⋀ | $\lambda_x$ ⋀ $\lambda_i$ ⋀ |
| OUTPUT OF BRANCHING DEVICE | $\lambda_i$ ⋀ | $\lambda_i$ ⋀ | $\lambda_x$ ⋀ $\lambda_i$ ⋀ |
| OUTPUT OF OPTICAL AMPLIFIER | $\lambda_i$ ⋀⋀⋀ | $\lambda_i$ ⋀ (LEVEL CHANGE) | $\lambda_x$ ⋀ $\lambda_i$ ⋀⋀ |

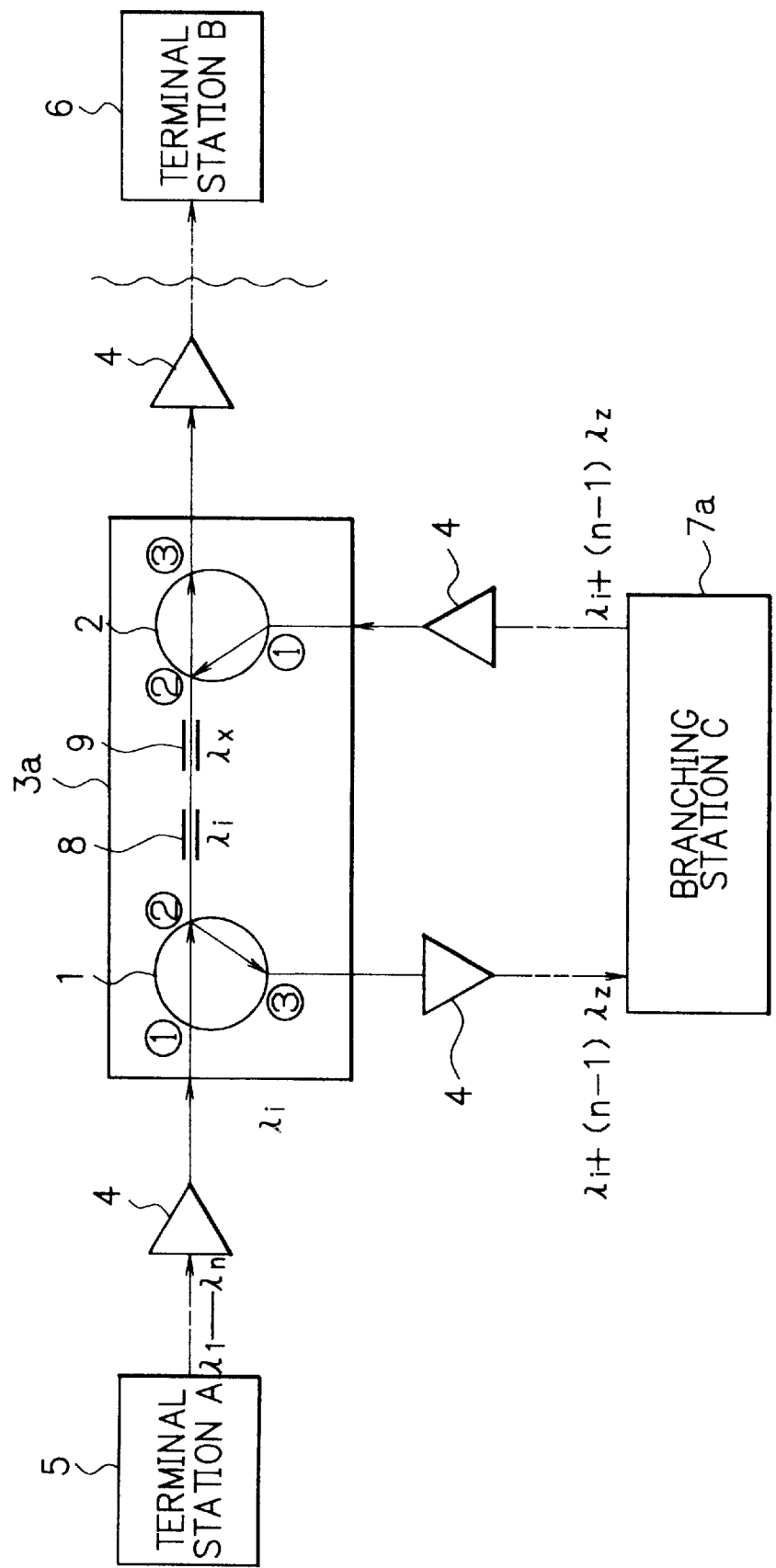

OPTICAL BRANCHING DEVICE AND METHOD OF OPTICAL TRANSMISSION

BACKGROUND OF THE INVENTION

The present invention relates to an optical branching device and a method of optical transmission. More to particularly this invention relates to an optical branching device for branching and inserting signal light which is subjected to wave-length multiplexing and to a method of optical transmission for transmitting signal light to transmission line in which the optical branching device is allocated.

DESCRIPTION OF THE PRIOR ART

Formerly, it is well known that an optical branching device comprises an optical circulator and a fiber grating as shown in FIG. 1.

In FIG. 1, the optical branching device $3a$ is constituted such that two pieces of three-terminal optical circulators 1, and 2 are allocated thereto, and a fiber grating 5 for reflecting specific transmission light with specific wave length $\lambda i$ within a plurality of transmission lights is allocated therebetween. The transmission light is inputted to a first terminal of a first three-terminal optical circulator 1, and outputted from a third terminal of a second three-terminal optical circulator 2. A fiber grating 8 is allocated between a second terminal of the three-terminal optical circulator 1 and a second terminal of the three-terminal optical circulator 2.

Operation of the optical branching device is described as follows:

N pieces of transmission lights with wave length of $\lambda 1$–$\lambda n$ which are subjected to wave-length multiplexing at a terminal station 5 to be transmitted. The transmission lights are inputted to a first terminal of the first three-terminal optical circulator 1 from an input path of optical branching device $3a$ via optical amplifier 4. The transmission lights $\lambda 1$–$\lambda n$ arrive at the fiber grating 8 via the second terminal. Here, only the light of specific wave length $\lambda i$ in the transmission lights is reflected by the fiber grating 8, thus being transmitted to a branching station $7a$ from the third terminal. The transmission lights having wave length with the exception of specific wave length $\lambda i$ are permeated through the fiber grating 8, thus being transmitted from the third terminal via the second terminal of the second three-terminal optical circulator 2. While the light with wave length $\lambda i$ is transmitted from the branching station $7a$. The light with wave length $\lambda i$ is inputted to the first terminal of the second three-terminal optical circulator 2, before being transmitted from the second terminal to be reflected by the fiber grating 8, thus being transmitted from the third terminal by way of the second terminal again. Namely, n pieces of transmission lights with the wave length of $\lambda 1$–$\lambda n$ are transmitted to the terminal station 6 from the third terminal of the second three-terminal optical circulator 2.

When it causes signal light to transmit using such the optical branching device, it is to be desired that output level of the light with the wave length $\lambda i$ which is subjected to branch-insertion is in agreement with output level of (n–1) pieces of respective transmission lights with the wave lengths $\lambda 1''\lambda n$ (exception for the light of the wave length $\lambda i$) which are subjected to no branch-insertion. If the output level differs from each other, signal-to-noise ratio namely S/N ratio of the light of the wave length $\lambda i$ and the light of the another wave length differ from each other, thereby, there occurs ill-influence in transmission characteristic. The optical amplifier used in this optical transmission system is controlled such that output level thereof comes to be constant even if output of the optical amplifier of transmission path or front stage is changed. For example, when the number of the transmission lights inputted to the optical amplifier increases from two to four, the level of the transmission light in every one piece comes to be half. Namely the level of the respective transmission lights is changed depending on increasing and/or decreasing of the number of the transmission lights which is set beforehand. Consequently, in FIG. 1, in order to adjust the level of the respective transmission lights from the optical branching device $3a$, there should be used the optical amplifier with different output level in one optical amplifier allocated at primary transmission path and in the other optical amplifier allocated at transmission path from the optical branching device to the branching station.

When it causes the number of the transmission lights for transmitting to be reduced for some reason or other, after constituting transmitting system while causing n pieces of signal lights to be subjected to wave-length multiplexing initially, or when disconnection of the transmission path occurs or other trouble, the number of the transmission lights for transmitting might be reduced. In this occasion, since the level of the respective transmission lights fluctuates from the original value, operating margin decreases because the optical transmission system departs from the optimum operating condition. When the level of the transmission lights of the primary transmission path deteriorates, the level of the light transmitted from the branching station does not agree with the level of the transmission light of the primary transmission path, thus transmission characteristic deteriorates.

SUMMARY OF THE INVENTION

In view of the foregoing, it is an object of the present invention to provide an optical branching device which is in use for optical transmission system, and a method of optical transmission, wherein when the number of transmission light or the level thereof is changed due to disconnection or other trouble, it causes level of the transmission lights of the primary transmission path to maintain at prescribed level, or it causes the level of the transmission light from the branch office to be adjusted, in order to maintain the optimum operating condition of the system.

It is another object of the present invention, in the above-described system, when the number of the transmission lights being subjected to wave-length multiplexing is reduced from the original number intentionally, it causes the optimum operating condition of the system to be maintained.

In accordance with one aspect of the present invention, for achieving the above-mentioned objects, there is provided an optical branching device which comprises two pieces of optical circulators, and a fiber grating which is arranged in between the two pieces of optical circulators, wherein the fiber grating consists of a plurality of fiber grating elements which are allocated in series.

Preferably, there is provided an optical branching device wherein the plurality of fiber grating elements reflect lights of the different wave length respectively.

Preferably, there is provided an optical branching device wherein a light of a wave length reflected by at least one fiber grating element in the plurality of fiber grating elements is in agreement with one of transmission lights of the plurality of wave lengths, while a light of a wavelength reflected by at least one of another fiber grating elements is different from any of the transmission lights of the plurality of wave lengths.

Preferably, there is provided an optical branching device wherein the optical circulator is a three-terminal optical circulator causing signal to transmit from a terminal 1 to a terminal 2, from the terminal 2 to a third terminal 3, in a first three-terminal optical circulator, a transmission light is inputted to the terminal 1, said terminal 2 is connected to one of the plurality of fiber grating elements, and the terminal 3 is connected to a branch path of a branching station, while in a second three-terminal optical circulator, the terminal 1 is connected to an insertion path from the branching station, the terminal 2 is connected to another fiber grating element which is different from the one of the plurality of fiber grating elements, and the transmission light is transmitted from the terminal 3.

In accordance with another aspect of the present invention there is provided a wave-length multiplexing transmission system which comprises a plurality of optical branching devices of the above one aspect which devices are arranged in series in between terminal stations.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 3 is a view for explaining operation when malfunction occurs in the optical transmission system of FIG. 2;

FIG. 4 is a view showing level of respective wave length when the transmission light is four-wave length in FIG. 3;

FIG. 6 is a view showing level of respective wave lengths when the transmission light is four-wave length in FIG. 5;

FIG. 7 is a view for explaining operation when malfunction occurs in the optical transmission system of FIG. 2;

DETAILED DESCRIPTION OF THE PREFERRED EMBODIMENTS

A preferred embodiment of the present invention will now be described in detail referring to the accompanying drawings.

Figure 1:
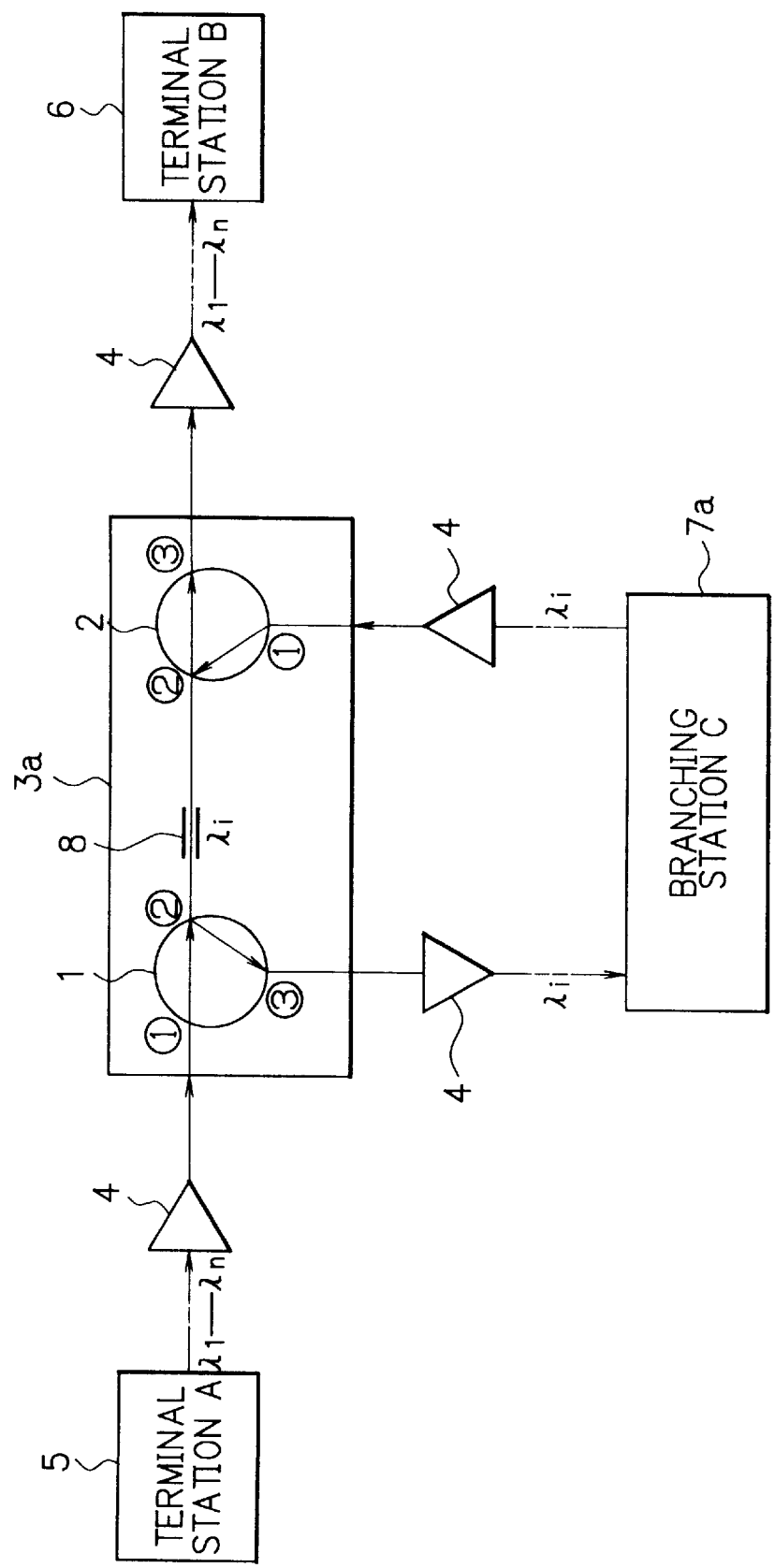
FIG. 1 is a view showing a constitution example and operation example of optical transmission system including conventional optical branching device.
Figure 2:
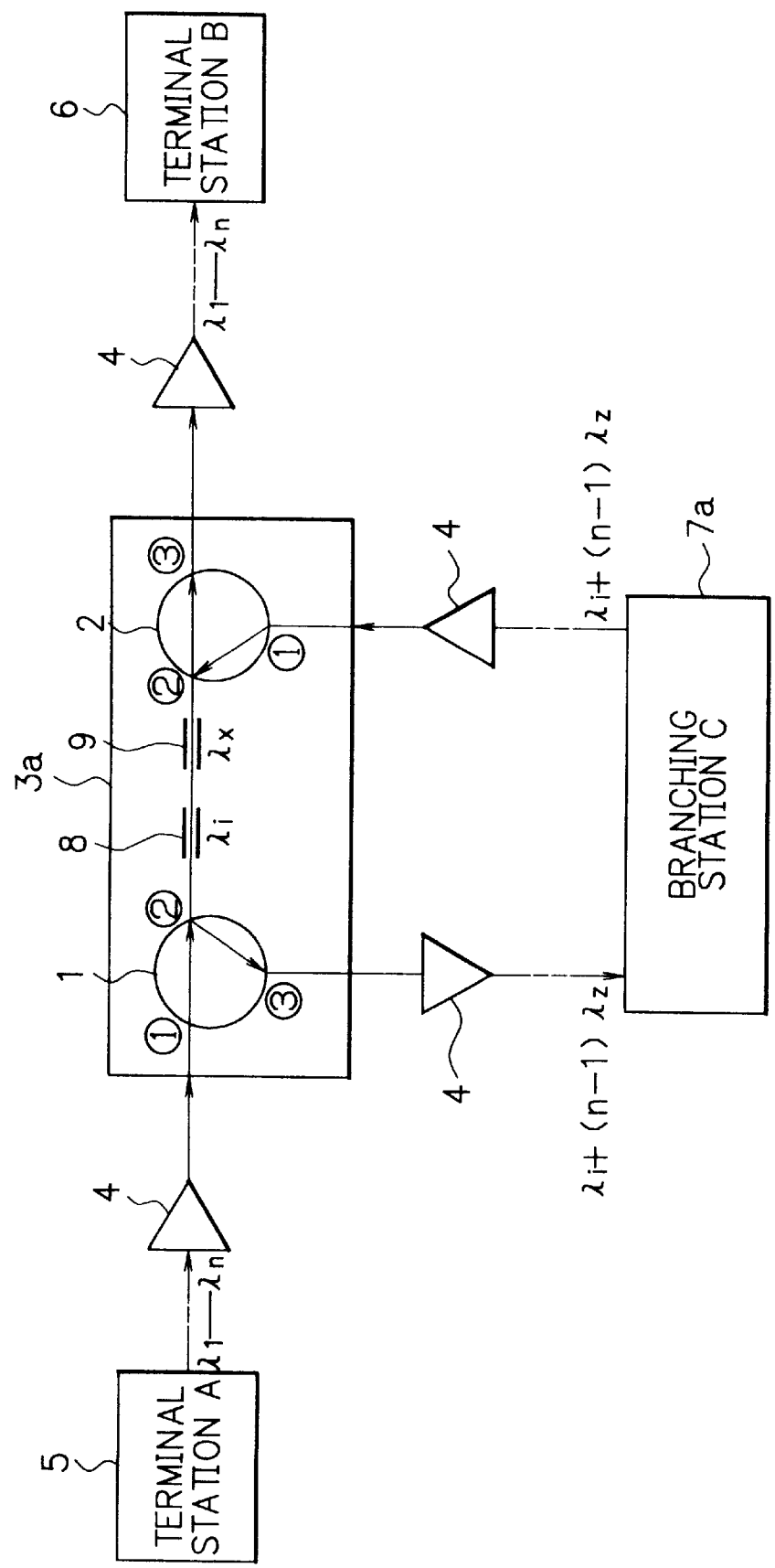
FIG. 2 is a view showing constitution example and operation example of optical transmission system including optical branching device according to the present invention.

FIG. 2 is a view showing constitution example and operation example of optical transmission system including optical branching device according to the present invention. A constitution example of an optical branching device of the present invention will be described referring to FIG. 2.

There are allocated two three-terminal optical circulators 1, 2, and two fiber gratings 8, 9 which reflect specific wave lengths $\lambda i$ and $\lambda x$ respectively in a plurality of transmission lights in between. The specific wave length $\lambda i$ is the same wave length as one wave length in the plurality of the transmission lights. The specific wave length $\lambda x$ differs from any wave length of the plurality of transmission lights, and which wave length $\lambda x$ is of within the wave length capable of being amplified by optical amplifier (also $\lambda y$, $\lambda z$). In FIGS. 2 to 12, description of $\lambda i$ and $\lambda x$ in the optical branching device denotes that the optical circulator which reflects these wave lengths $\lambda i$ and $\lambda x$ is allocated therein and symbols ①, ②, ③, denote number of terminal of the three-terminal optical circulator.

At the time of normal operation, the optical transmission system of FIG. 2 operates as follows: when n pieces of transmission lights with the wave lengths $\lambda 1$ to $\lambda n$ are transmitted from the terminal station 5 (terminal station A), these transmission lights enter into the optical branching device 3a, before only the transmission light of the specific wave length $\lambda i$ is transmitted from the terminal 3 to the branching station 7a (branching station C) by the fiber grating 8. While (n–1)pieces of transmission lights with the wave lengths $\lambda 1$ to $\lambda n$ (exception for wave length $\lambda i$) enter into the terminal 2 of the next optical circulator 2 via the fiber gratings 8, 9 from the terminal 2, thus being transmitted from the terminal 3. Light with level of (n–1) times one transmission light and transmission light with the above wave length $\lambda i$ (level equals one) are transmitted with different wave length $\lambda z$ from the transmission light from the branching station 7a. Hereinafter, in the specification and drawings, such a transmission light is represented as $\lambda i+(n-1)\lambda z$. The $\lambda i+(n-1)\lambda z$ is inputted to the terminal 1 of the optical circulator 2. The light with the wave length of $\lambda i$ thereof is reflected by the fiber grating 8, thus being transmitted together with (n–1) pieces of transmission lights with the wave lengths of $\lambda 1$ to $\lambda n$ (exception for wave length $\lambda i$) from the optical circulator 1 from the optical branching device 3a.

Consequently, n pieces of transmission lights with the wave lengths of $\lambda 1$ to $\lambda n$ transmitted from the terminal station 5 arrive at the terminal station 6 exception for fluctuation of the level. The light with the wave length of (n–1), $\lambda z$ transmitted from the branch office 7a returns to the branching station 7a from branch path while permeating the optical branching device 3a.

Next, when it causes number of transmission lights to reduce intentionally by k pieces at the time to transmit n pieces transmission lights on primary transmission path, level of respective transmission lights of the primary transmission path comes to be n/k times in comparison with normal time because output level of the optical amplifier is fixed. In this case, it causes light ($k\lambda y$) of level of k times respective transmission light to transmit from the terminal station 5 with different wave length $\lambda y$ from the transmission light. Due to this transmission, it comes to be the same state as the case where it causes n pieces of transmission lights to transmit initially. Namely level of transmitted transmission lights is maintained in the same level as the case where the transmission lights are transmitted initially.

Next, operation at the time when malfunction occurs in the optical transmission system of FIG. 2 will be described referring to FIGS. 3 to 7.

FIG. 3 shows an example of the case where a branch path and insertion path are disconnected with each other in between the branching device 3a and a branching station 7a. The terminal station 5 recognizes for some way or other that a route to the branching station 7a is disconnected, thus transmitting (n−1) pieces of transmission lights with the wave lengths of λ1 to λn (exception for λi) and light with the different wave length λy from wave length of transmission light. The whole light with these wave length reach the terminal station 6 because the whole light with these wave length do not reflect at the branching device 3a. Since the number of the transmission lights is n pieces, and the number is not changed as usual, the level of respective transmission lights remains.

In the case of FIG. 3, when four pieces of transmission lights exist therein, operation will be explained referring to FIG. 4.

In times of normal state (there is no disconnection), the same level of four pieces of transmission lights are subjected to wave-length multiplexing to be transmitted from the terminal station A. Only the light with the wave length λi in four pieces of transmission lights is transmitted toward the branching station 7a. The branching station 7a transmits the light with the wave length λi, simultaneously, the branching station 7a transmits the light with the wave length λz which differs from wave length of the transmission lights, with three times level of respective transmission light. The light with the wave length λz is transmitted to the branching station 7a from the branch path of the branching device 3a.

The light with the wave length λi is reflected by the fiber grating 8, thus output of branching device 3a comes to equal to output of terminal station 5.

At the time when the line is disconnected, although four pieces transmission lights with the same level are subjected to wave-length multiplexing to be transmitted from the terminal station 5, the transmission light with the wave length λi is reflected by the fiber grating 8, thus being transmitted to branching path. With the result that the output from the optical branching device 3a comes to be three pieces of transmission lights. When these three pieces of transmission lights permeate the optical amplifier 4, the level in every one of three pieces of transmission lights comes to be 4/3 times initial level.

In the present invention, at the time when the line is disconnected, it causes the light with the wave length λy to transmit from the terminal station 5 which wave length λy differs from the transmission light instead of the light with the wave length λi. These three pieces of transmission lights and the light with the wave length λy are permeated through the branching device 3a to be inputted to the optical amplifier 4. However, since the number of the transmission lights are four pieces, the level of respective transmission lights remains even if respective transmission lights permeate via the optical amplifier 4.

Figure 5:
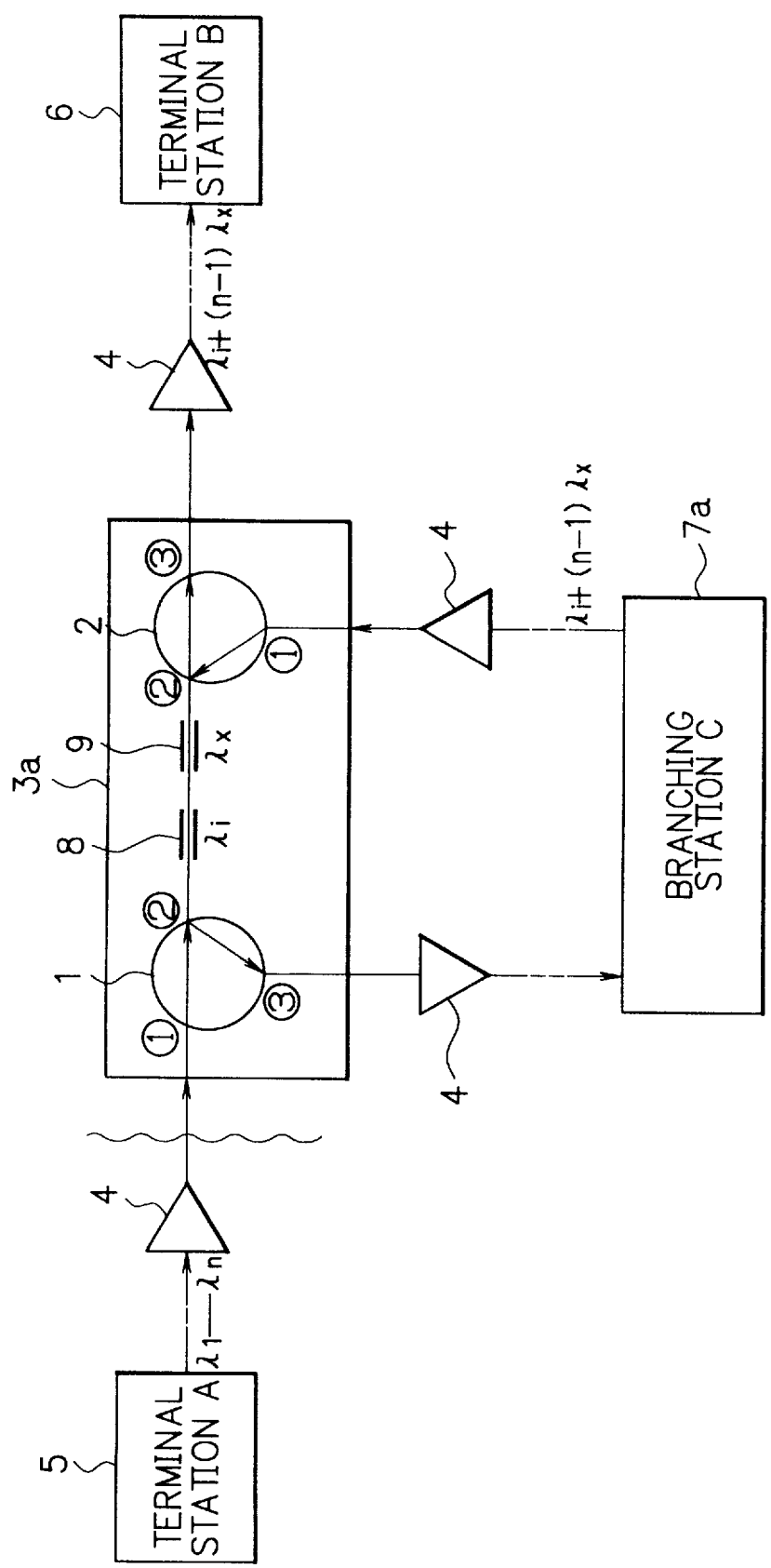
FIG. 5 is a view for explaining operation when malfunction occurs in the optical transmission system of FIG. 2.

FIG. 5 shows the cases where disconnection occurs in between the terminal station 5 and the optical branching device 3a. It causes the light with the wave length λi of the transmission light and the light with the wave length λx which differs from the wave length of the transmission lights to transmit from the branching station 7a. The light with the wave length λx is taken to be the level of (n−1) level of respective transmission lights. These lights with the wave lengths λi+(n−1) λx are reflected entirely by the fiber gratings 8, 9 in the optical branching device 3a. The total lights with the wave lengths λi+(n−1) λx are the same level as that of n pieces transmission lights, therefore, the level of the light with the wave length λi remains if the light permeates via the optical amplifier 4.

In the case of FIG. 5, when four pieces of transmission lights exist therein, operation will be explained referring to FIG. 6.

In times of normal state (there is no disconnection), the same level of four pieces of transmission lights are subjected to wave-length multiplexing to be transmitted from the terminal station 5 (terminal station A). Only the light with wave length λi in four pieces of transmission lights is transmitted toward the branching station 7a (branching station C). The branching station 7a transmits the light with the wave length λi, simultaneously, the branching station 7a transmits the light with the wave length λz which differs from wave length of the transmission lights, with three times level of respective transmission light. The light with the wave length λz is transmitted to the branching station 7a from the branch path of the branching device 3a. The light with the wave length λi is reflected by the fiber grating 8, thus output of branching device 3a comes to equal to output light of terminal station 5.

At the time when the line is disconnected, although the same level of four pieces of transmission lights are subjected to wave-length multiplexing to be transmitted from the terminal station A, these transmission lights do not reach the optical branching device 3a. At this time when one of the transmission light with the wave length λi and the light with the above wave length λz are transmitted from the optical branching device 3a with the level of three times respective transmission lights, only the light with the wave length λi is transmitted from the optical branching device 3a, thus being amplified to the level of four times the initial state by the optical amplifier 4.

In the present invention, at the time when the line is disconnected, it causes the light of the wave length λx with the level of three times respective transmission lights and the light of the wave length λi to transmit which λx differs from the transmission light from the branch office 7a. These lights are reflected by the branching device 3a, thus being inputted to the optical amplifier 4. However, since the number of the transmission lights is four pieces, the level of the light of the wave length λi remains if these lights permeate through the optical amplifier 4.

FIG. 7 shows that disconnection occurs in between the optical branching device 3a and the terminal station 6. There are transmitted n pieces of the transmission lights with the wave lengths λ1 to λn from the terminal office 5. The light with the wave length λi in the transmission lights is reflected to be transmitted to the branch path. The branching station 7a transmits the light with the wave length λi and the light with the wave length λz which differs from the wave length of respective transmission lights with the level of (n−1) times respective transmission lights. The lights with the wave lengths (n−1) λz in the lights of the wave lengths λi+(n−1) λz permeates the optical branching device 3a to be transmitted to the branch path. Consequently, the transmission light with the wave length λi is inputted to the branch office 7a with the initial level.

Next, operation of the optical transmission system in which two optical branching devices are connected will be explained referring to FIGS. 8 to 13. Indications of (λi, λx) in the optical branching device of these drawings denote that the fiber gratings which reflect the lights of these wave length are allocated.

Figure 8:
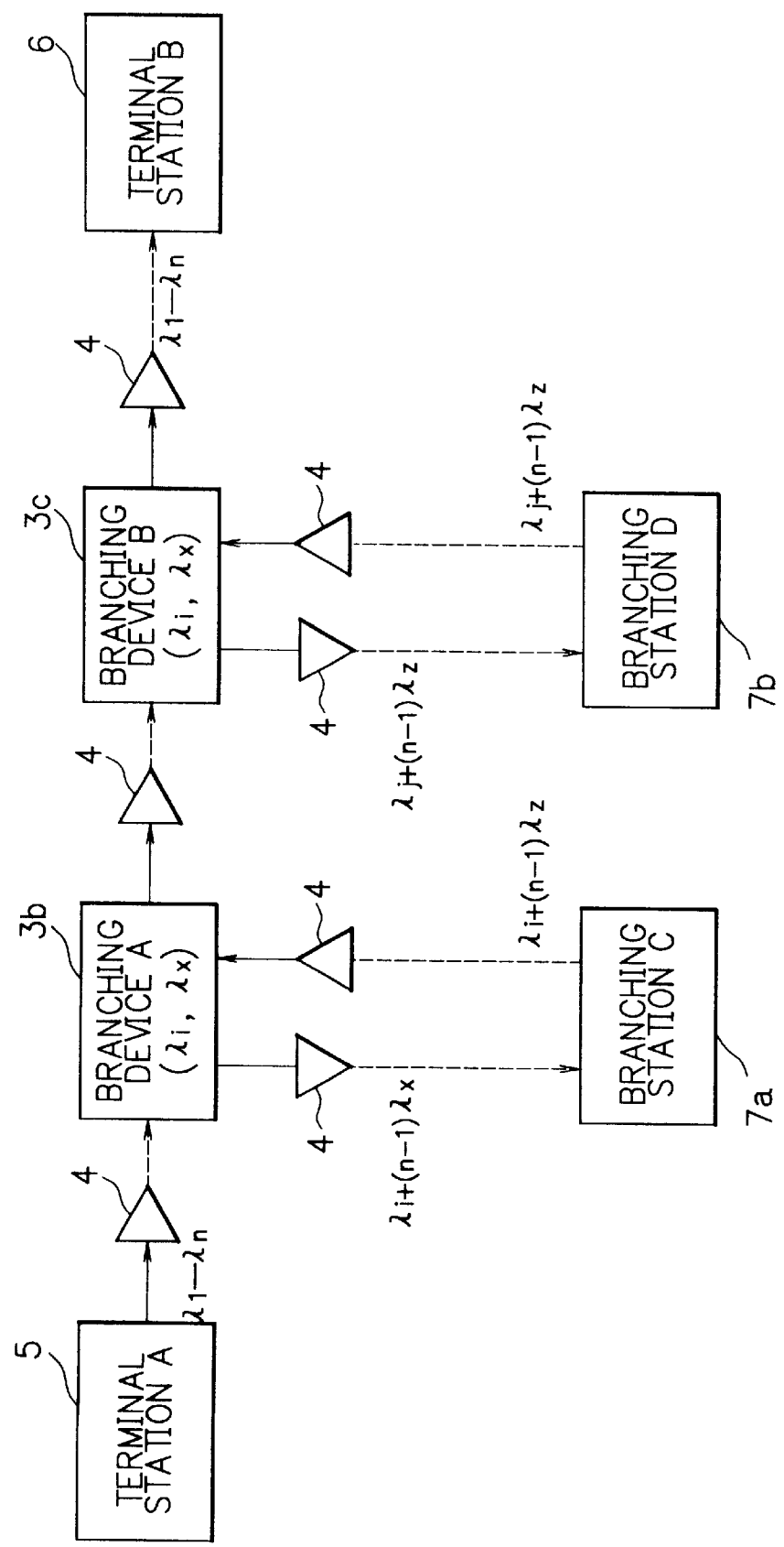
FIG. 8 is a view showing a constitution example and an operation example of an optical transmission system including two optical branching devices.

FIG. 8 shows a fundamental constitution of the optical transmission system in which the optical branching devices 3b, 3c are allocated in series to primary transmission path. There are transmitted n pieces transmission lights with the wave lengths $\lambda 1$ to $\lambda n$ from the terminal station 5. The transmission light of the wave length $\lambda i$ is reflected at the optical branching device 3b to be transmitted to the branching station 7a. The branching station 7a transmits the light with the wave lengths $\lambda i+(n-1)) \lambda z$. The light with the wave lengths $(n-1) \lambda z$ in the lights with the wave lengths $\lambda i+(n-1) \lambda z$ are permeated through the optical branching device 3b to be transmitted to the branch path, while the light with the wave length $\lambda i$ is transmitted to next optical branching device 3c. The lights with the wave lengths $\lambda 1$ to $\lambda n$ are inputted to the optical branching device 3c. The transmission light with the wave length $\lambda j$ of the lights with the wave lengths $\lambda 1$ to An is reflected thereby, thus being transmitted to the branching station 7b. The branching station 7b transmits the light with the wave lengths $\lambda j+(n-1), \lambda z$. The lights with the wave lengths $(n-1) \lambda z$ of the lights with the wave lengths $\lambda j +(n-1) \lambda z$ are permeated through the optical branching device 3c to be transmitted to the branch path, while the light with the wave length $\lambda j$ together with the other transmission lights are transmitted from the optical branching device 3c. Namely, n pieces of transmission lights with the wave lengths $\lambda 1$ to $\lambda n$ which are the same light with the wave lengths $\lambda 1$ to $\lambda n$ as that transmitted from the terminal station 5 from the optical branching device 3c. Further, the lights of the wave lengths $\lambda i, \lambda j$ are transmitted normally to the branching stations 7a, 7b.

Figure 9:
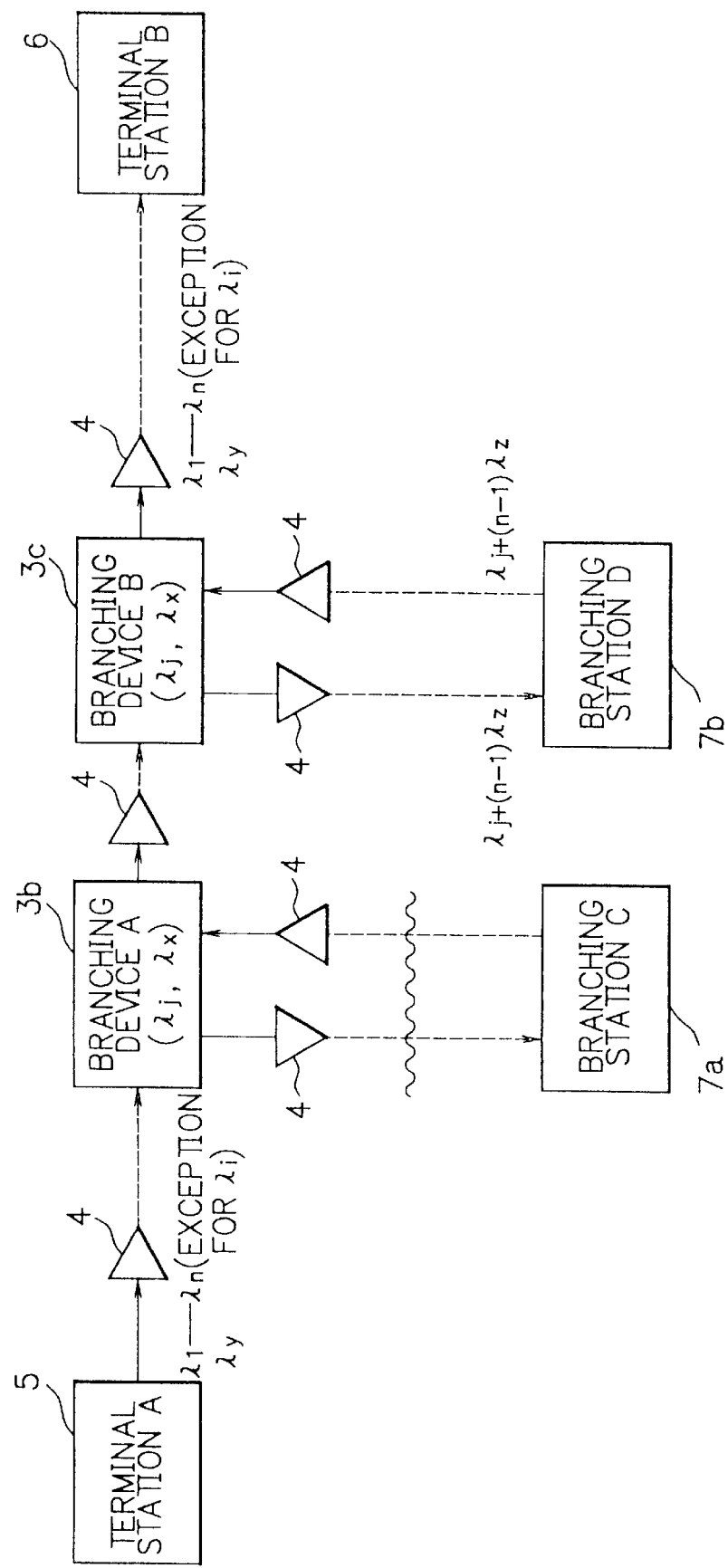
FIG. 9 is a view for explaining operation when malfunction occurs in the optical transmission system of FIG. 8.

FIG. 9 shows an example of the case where disconnection occurs in between the optical branching device 3b and the branching station 7a in the constitution of FIG. 8. There are transmitted (n-1) pieces of the transmission light with the wave lengths $\lambda 1$ to $\lambda n$ exception for the light with the wave length $\lambda i$ and the light with wave length $\lambda y$ which differs from the wave length of respective transmission light from the terminal station 5. These lights with the wave lengths $\lambda 1$ to $\lambda n$ exception for the light with the wave length $\lambda i$ and the light with the wave length $\lambda y$ are permeated through the optical branching device 3b. The light with the wave length $\lambda j$ is reflected by the next optical branching device 3c to be transmitted to the optical branching station 7b. The transmission lights transmitted from the terminal station 5 exception for the light with the wave length $\lambda j$ and the light of the wave length $\lambda y$ are permeated through the optical branching device 3c. The optical branching station 7b transmits the lights with the wave lengths $\lambda j+(n-1) \lambda z$ for the optical branching device 3c, the light with the wave length $\lambda j$ thereof is reflected by the optical branching device 3c to be transmitted to the terminal station 6. While the lights with the wave lengths $(n-1) \lambda z$ is permeated the optical branching device 3c to be transmitted to the optical branching station 7b. As described above, the transmission light outputted from the optical branching device 3c are the lights with the wave lengths $\lambda 1$ to $\lambda n$ exception for the light with the wave length $\lambda i$ and the light with the wave length $\lambda y$ which are the same light as the light transmitted by the terminal station 5. The light with the wave length to the branching station is the same level as the initial level. For this reason, the level of respective transmission lights remains.

Figure 10:
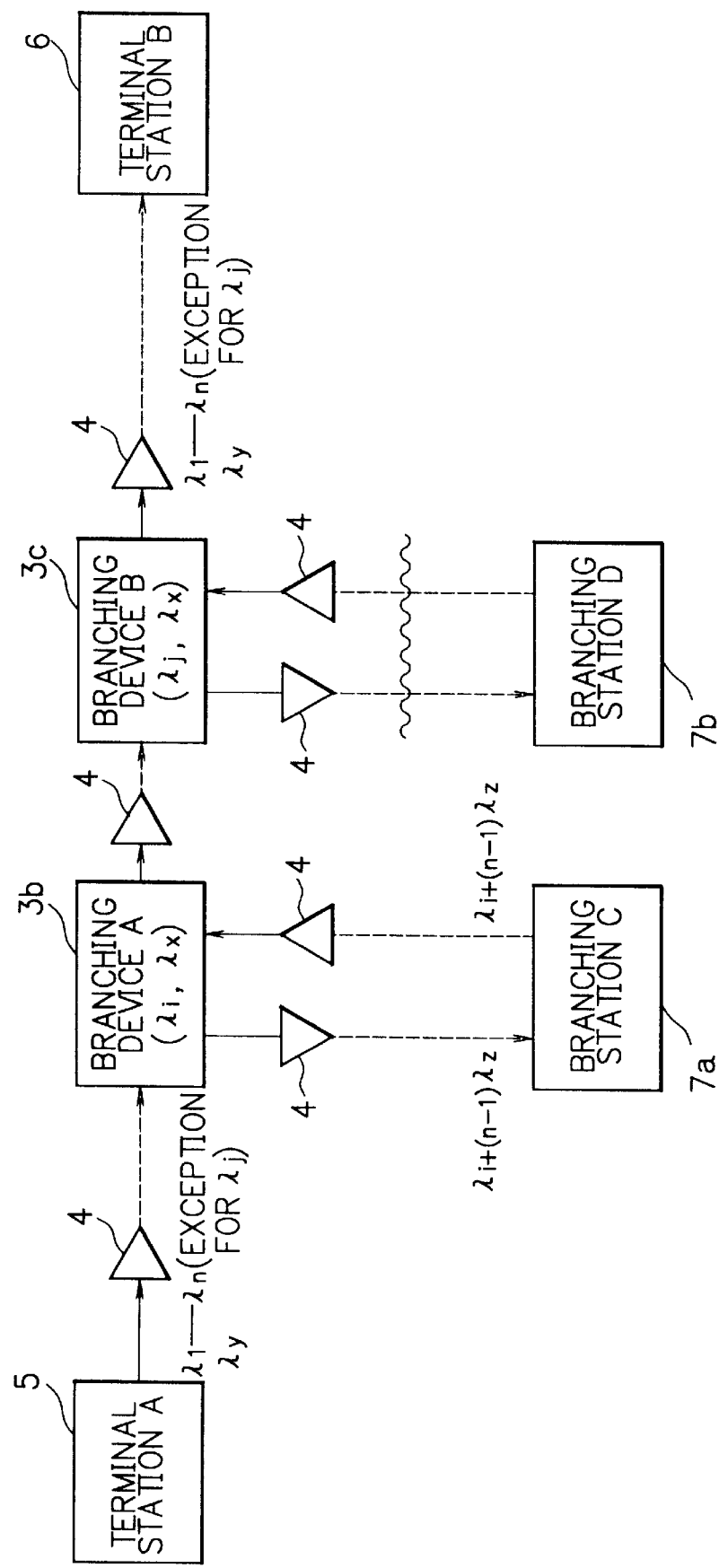
FIG. 10 is a view for explaining operation when malfunction occurs in the optical transmission system of FIG. 8.

FIG. 10 shows an example of the case that disconnection occurs in between the optical branching device 3c and the branching station 7b in the constitution of FIG. 8. There are transmitted (n-1) pieces of the transmission light with the wave lengths $\lambda 1$ to $\lambda n$ exception for the light with the wave length $\lambda j$ and the light with wave length $\lambda y$ which differs from the wave length of respective transmission light from the terminal station 5. The light with the wave length $\lambda i$ is reflected at the optical branching device 3b to be transmitted to the optical branching station 7a. The optical branching station 7a transmits the light with the wave lengths $\lambda i+(n-1) \lambda z$ to the optical branching device 3b. The light with the wave length $\lambda i$ thereof is reflected by the optical branching device 3b, thus being transmitted to the next optical branching device 3c.

The transmission lights transmitted from the terminal station 5 exception for the light with the wave length $\lambda i$ and the light with the wave length $\lambda y$ are permeated through the optical branching device 3b. The optical branching station 7a transmits the light with the wave lengths $\lambda i+(n-1) \lambda z$ to the optical branching device 3b. The light with the wave length $\lambda i$ thereof is reflected by the optical branching device 3b, thus being transmitted to the next optical branching device 3c. While the lights with the wave lengths $(n-1) \lambda z$ is permeated the optical branching device 3b to be transmitted to the optical branching office 7a. Thus the same lights as the lights woth the wave lengths $\lambda 1$ to $\lambda n$ exception for the light with the wave length $\lambda i$ transmitted from the terminal station 5 are transmitted from the optical branching device 3b, thus permeating the optical branching device 3c as they are. Consequently, the level of respective transmission lights remains.

Figure 11:
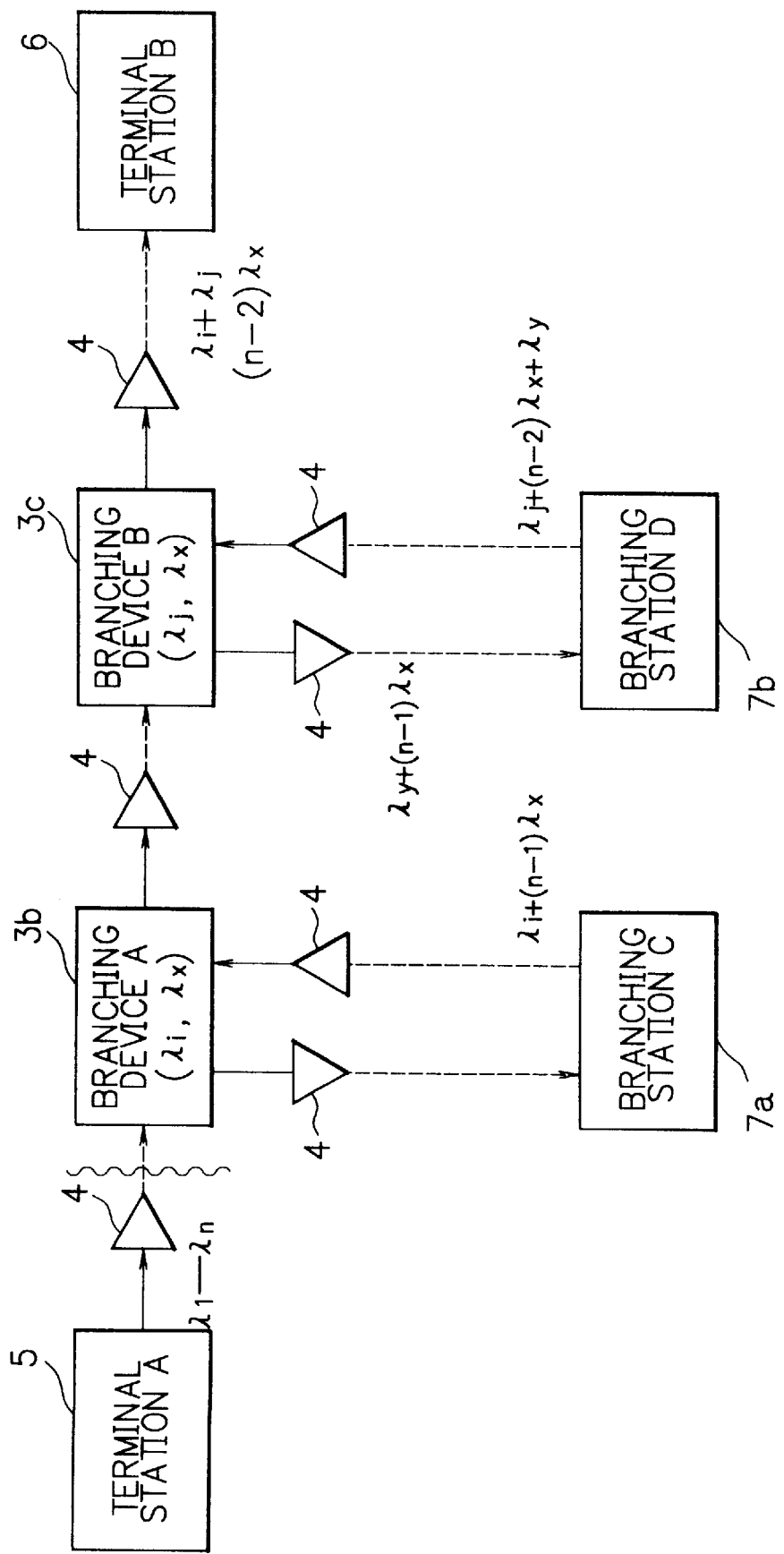
FIG. 11 is a view for explaining operation when malfunction occurs in the optical transmission system of FIG. 8.

FIG. 11 shows an example of the case that disconnection occurs in between the terminal station 5 and the optical branching device 3b in the constitution of FIG. 8. The transmission lights are not inputted to the optical branching device 3b. The light with the wave length $\lambda i$ and the light with the wave length $\lambda x$ with the level of (n-1) times one piece of transmission light are transmitted from the branching station 7a to the optical branching device 3b. These lights with the wave lengths $\lambda i+(n-1) \lambda x$ are reflected by the optical branching device 3b to be entered into the optical branching device 3c. The light with the wave lengths $(n-1) \lambda x$ are transmitted to the branching station 7b, while the light with the wave length $\lambda i$ permeates. The branching station 7b transmits the transmission light with the wave length $\lambda j$, (n-2) pieces of the lights with the wave length $\lambda x$, and one piece of the light with the wave length $\lambda y$ to the optical branching device 3c. The light with the wave length (n-2) $\lambda x$ and the light with the wave length $\lambda j$ thereof are transmitted from the optical branching device 3c to the terminal station 6. The light with the wave length $\lambda y$ is transmitted to the branching station 7b while permeating the optical branching device 3c. Namely, the transmission lights with the wave lengths $\lambda i, \lambda j$ are transmitted normally to the terminal station 6 with unchangeable level because the lights corresponding to n pieces of the lights of the level are transmitted from the optical branching device 3c. The lights corresponding to n pieces of lights go and come back between the optical branching device 3c and the branching station 7b.

Figure 12:
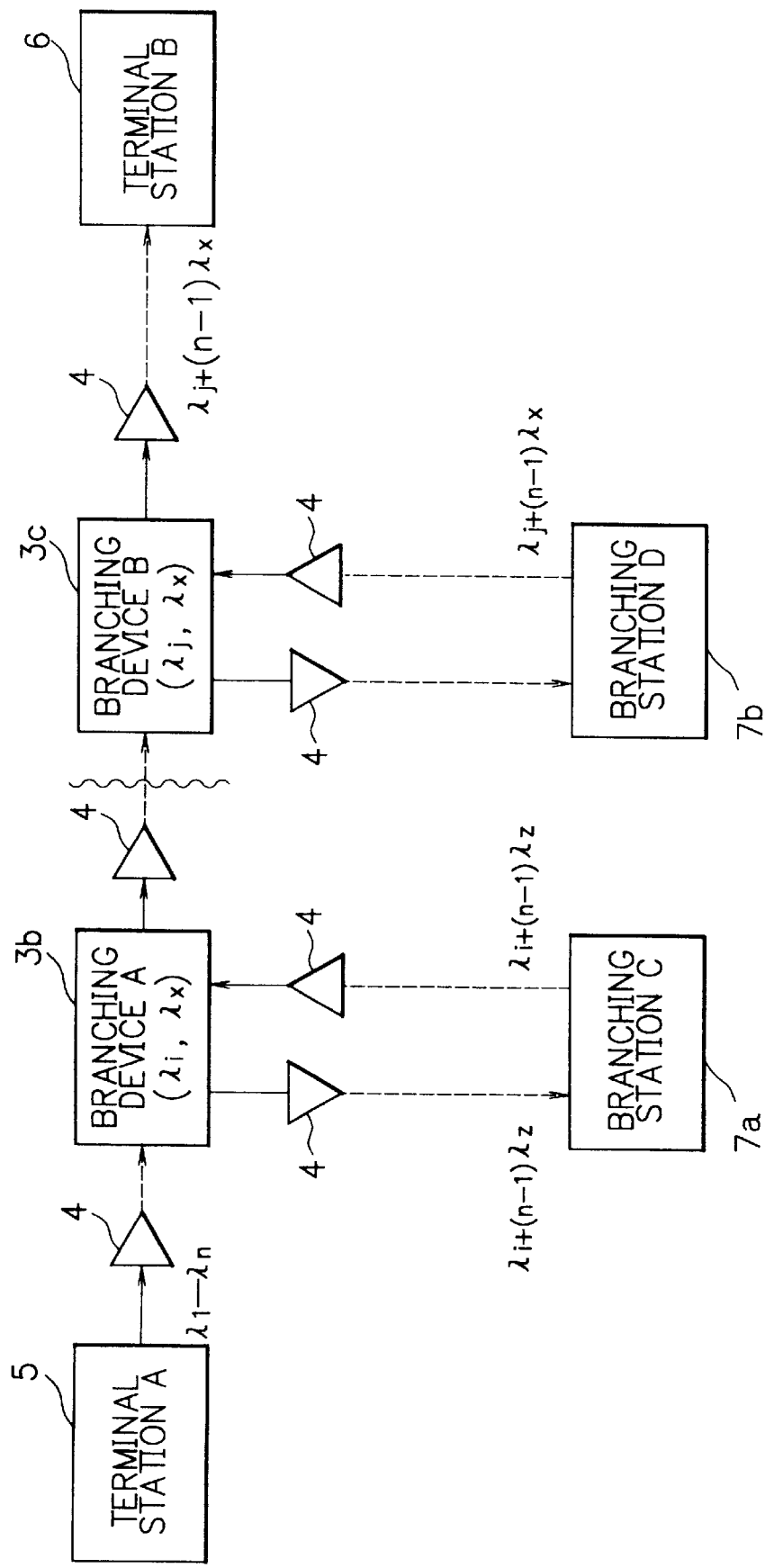
FIG. 12 is a view for explaining operation when malfunction occurs in the optical transmission system of FIG. 8.

FIG. 12 shows an example of the case that disconnection occurs in between the optical branching device 3b and the optical branching device 3c in the constitution of FIG. 8. The n pieces of transmission lights with the wave lengths $\lambda 1$ to $\lambda n$ are transmitted from the terminal station 5. The light with the wave length $\lambda i$ thereof is transmitted from the optical branching device 3b to the branching station 7a. The branching station 7a transmits the lights with the wave lengths $\lambda i+(n-1) \lambda z$ for the optical branching device 3b. The lights with the wave lengths $(n-1) \lambda z$ are transmitted to the branching station 7a while permeating the optical branching device 3b. While the lights with the wave lengths $\lambda j+(n-1) \lambda x$ are transmitted from the branching station 7b to the optical branching device 3c. These lights are entirely reflected by the optical branching device thus transmitting to the terminal station 6. Consequently, the light with the wave length λi is normally transmitted from the terminal station 5 to the branching station 7a, while the light with the wave length λj is normally transmitted from the branching station 7b to the terminal station 6.

Figure 13:
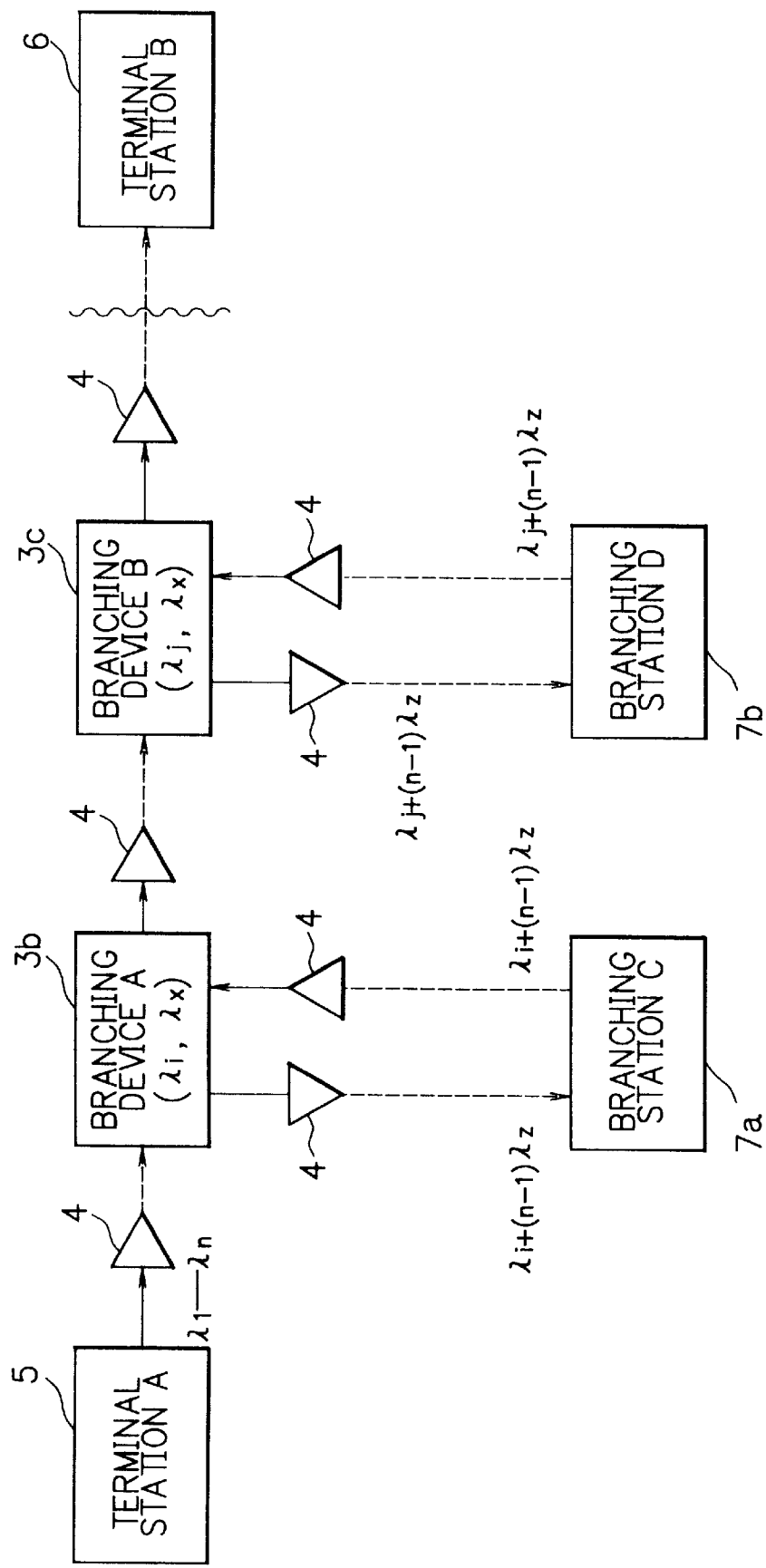
FIG. 13 is a view for explaining operation when malfunction occurs in the optical transmission system of FIG. 8.

FIG. 13 shows an example of the case that disconnection occurs in between the optical branching device 3c and the terminal station 6 in the constitution of FIG. 8. The n pieces of transmission lights with the wave lengths λ1 to λn are transmitted from the terminal station 5. The light with the wave length λi thereof is transmitted from the optical branching device 3b to the branching station 7a. The branching station 7a transmits the lights with the wave lengths λi+(n−1)) λz for the optical branching device 3b. The lights with the wave lengths (n−1) λz thereof are transmitted to the branching station 7a while permeating the optical branching device 3b. The light with the wave length λi is directed to the next optical branching device 3c while reflecting from the optical branching device 3b. Consequently, output light from the optical branching device 3b to the next optical branching device 3c is the same light as the light transmitted from the terminal station. In regard to the optical branching device 3c, the light with the wave length λj is transmitted to the branching station 7b. The branching station 7b transmits the light with the wave lengths λj+(n−1) λz for the optical branching device 3c. The light with the wave lengths (n−1) λz thereof are transmitted to the branching station 7b while permeating the optical branching device 3c. Consequently, the light with the wave length λi is normally transmitted from the terminal station 5 to the branching station 7a, while the light with the wave length λj is normally transmitted from the terminal station 5 to the branching station 7b.

As described above, there is explained the cases where it causes the transmission light by one wave length to diverge to be inserted. It is capable of diverging to be inserted more than two wave lengths of the transmission lights. Further there is explained the cases where it causes one fiber grating to provide therewith which fiber grating reflects the light of the wave length which differs from that of the transmission lights in the optical branching device. It is capable of being provided therewith more than two pieces of the fiber gratings.

In the above described optical transmission system, there is described that simultaneous disconnection of branch path and insertion path occurs in between the optical branching device and the branching station, however, when either the branch path or the insertion path is disconnected, the present invention comes to be effective in either case.

In the above description, the case of disconnection in the transmission path is explained. However, for example in FIG. 2, when the level of the transmission lights with the wave length λ1 to λn inputted to the optical branching device 3a deteriorates for some cause or other, it causes the light with the wave length λi transmitted from the branching station to the optical branching device 3a to meet to the respective lights of the deteriorated level. At this time, it causes the level of the light with the wave lengths (n−1) λz transmitted from the branching station 7a to adjust (this case making it larger) so that it is capable of adjusting the level of the light with the wave length λi being transmitted therewith. Due to this operation, it is capable of transmitting normally the transmission lights with the wave lengths λ1 to λn of the primary transmission path to the terminal station.

The transmission lights which are subjected to wavelength multiplexing to be transmitted are set that for example the wave length is of interval 0.8 n. sec with 1.5585 μm as the center.

The fiber grating is of the well known element. The fiber grating is formed such that a plurality of cores and layers with different refractive index are placed one upon another with prescribed intervals.

As described above, although the optical circulator is utilized as the element for reflecting specific wave length, it is capable of constituting the same function as that of the optical circulator due to combination of an optical branching filter, a band pass filter and an edge filter.

As described above, in accordance with the present invention, when disconnection occurs at a part of the transmission path, or when it causes the number of the transmission lights to reduce deliberately, optimum operating condition or operating margin of the optical transmission system is capable of being maintained because it causes the level of the transmission light to maintain at the prescribed level while transmitting the light of the wave length which differs from the transmission lights, from the terminal station or the branching station. Under the condition that the level of the light transmitted from the branching station does not agree with the level of the transmission light of the primary transmission path, deterioration of the transmission characteristic is capable of being prevented while adjusting these levels. Further, in the above described system, the optical amplifier with same characteristic is capable of being utilized.

While preferred embodiments of the invention have been described using specific terms, such description is for illustrative purposes only, and it is to be understood that changes and variations may be made without departing from the spirit or scope of the following claims.

What is claimed is:

1. An optical branching device comprising:
   two pieces of optical circulators; and
   a fiber grating which is allocated in between said two pieces of optical circulators,
   wherein said fiber grating consists of a plurality of fiber grating elements which are arranged in series, wherein at least one of said fiber grating elements compensates for a change in a number of or a level of transmission lights, processed by said device, such that an output level of or an output number of transmission lights is maintained at a prescribed level, even when said number of or said level of transmission lights is decreased by a disconnection between inputs or outputs of said device and separate stations.

2. An optical branching device as claimed in claim 1, wherein said plurality of fiber grating elements reflect lights with the different wave lengths respectively.

3. An optical branching device as claimed in claim 2, wherein a light with a wave length reflected by at least one fiber grating element in said plurality of fiber grating elements is in agreement with one of said transmission lights with a plurality of wave lengths, while a light with a wavelength reflected by at least one of another fiber grating elements is different from any of said transmission lights with the plurality of wave lengths.

4. An optical branching device as claimed in claim 1, wherein said optical circulator is a three-terminal optical circulator causing a signal to transmit from a terminal 1 to a terminal 2, from said terminal 2 to a third terminal 3, in a first three-terminal optical circulator, a transmission light is inputted to said terminal 1, said terminal 2 is connected to one of said plurality of fiber grating elements, and said terminal 3 is connected to a branch path of a branching station, while in a second three-terminal optical circulator, said terminal 1 is connected to an insertion path from said station, while in a second three-terminal optical circulator, said terminal 1 is connected to an insertion path from said branching station, said terminal 2 is connected to another fiber grating element which is different from said one of said plurality of fiber grating elements, and said transmission light is transmitted from said terminal 3.

5. A wave-length multiplexing transmission system comprising:

a plurality of optical branching devices of claim 1 which devices are allocated in series in between terminal stations.

6. A method for transmitting transmission lights through transmission path which includes more than one optical branching device of claim 1 comprising the steps of:

maintaining a level of transmission light to a prescribed level while transmitting light with a wave length which is different from said transmission light with a wave length from at least one of a terminal station and a branching station.

7. A method for transmitting transmission lights as claimed in claim 6, wherein it causes said transmission light to transmit from at least one of said terminal station and said branching station.

8. A method for transmitting transmission lights as claimed in claim 6, wherein a light with a wave length which is different from transmission lights transmitted from said terminal station is of the same level as that of one transmission light.

9. A method for transmitting transmission lights as claimed in claim 6, wherein a light with a wave length which is different from transmission lights transmitted from said branching station is of the same or larger level as that of respective transmission lights.

10. A method for transmitting transmission lights through transmission path which includes more than one optical branching device of claim 1 comprising the steps of:

changing a level of a light with a wave length which is different from transmission light with a wave length transmitted from either terminal station or branching station in response to change of a level of said transmission light of a primary transmission path.

* * * * *